United States Patent
He et al.

(10) Patent No.: US 11,720,315 B1
(45) Date of Patent: Aug. 8, 2023

(54) MULTI-STREAM VIDEO ENCODING FOR SCREEN SHARING WITHIN A COMMUNICATIONS SESSION

(71) Applicant: Zoom Video Communications, Inc., San Jose, CA (US)

(72) Inventors: Zhichu He, Hangzhou (CN); Yi Guo, Hangzhou (CN); Bo Ling, Saratoga, CA (US); Jing Wu, Hangzhou (CN); Yichen Zhang, Hangzhou (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/877,915

(22) Filed: Jul. 30, 2022

(30) Foreign Application Priority Data

Jul. 12, 2022 (CN) .......................... 202221790490.6

(51) Int. Cl.
*G06F 3/044* (2006.01)
*G06F 3/14* (2006.01)
*H04N 7/15* (2006.01)

(52) U.S. Cl.
CPC ............. *G06F 3/1454* (2013.01); *H04N 7/15* (2013.01)

(58) Field of Classification Search
CPC ....... H04N 21/234327; H04N 21/2662; H04N 21/4314; H04N 21/4622; H04N 21/4858; H04N 21/654; H04N 21/6587; H04N 7/152; H04N 5/2624; H04N 7/15; H04L 65/1083; H04L 65/762
See application file for complete search history.

(56) References Cited

U.S. PATENT DOCUMENTS

| | | | | |
|---|---|---|---|---|
| 2015/0334313 | A1* | 11/2015 | Chougle | H04L 65/1083 348/14.07 |
| 2019/0295455 | A1* | 9/2019 | Goodson | H01L 27/3211 |
| 2020/0118516 | A1* | 4/2020 | Kim | G09G 5/006 |

* cited by examiner

*Primary Examiner* — Insa Sadio
(74) *Attorney, Agent, or Firm* — Young Basile Hanlon & MacFarlane, P.C.

(57) ABSTRACT

Methods, systems, and apparatus, including computer programs encoded on computer storage media related to multi-stream video encoding for screen sharing a communications session. The system may determine a sub-area and a remaining area of a display region. A first video stream of the sub-area is generated at a first frame rate. A second video stream of the remaining area is generated at second frame rate, where the second frame rate is a frame rate lower than the first frame rate. A client device may transmit the first video stream and the second video stream to a second client device.

17 Claims, 10 Drawing Sheets

(12) United States Patent
US 11,720,315 B1

MULTI-STREAM VIDEO ENCODING FOR SCREEN SHARING WITHIN A COMMUNICATIONS SESSION

CROSS-REFERENCE TO RELATED APPLICATIONS

None.

FIELD

This application relates generally to video stream encoding, and more particularly, to systems and methods for multi-stream video encoding for screen sharing within a communications session.

SUMMARY

The appended claims may serve as a summary of this application.

DETAILED DESCRIPTION OF THE DRAWINGS

Figure 1A:
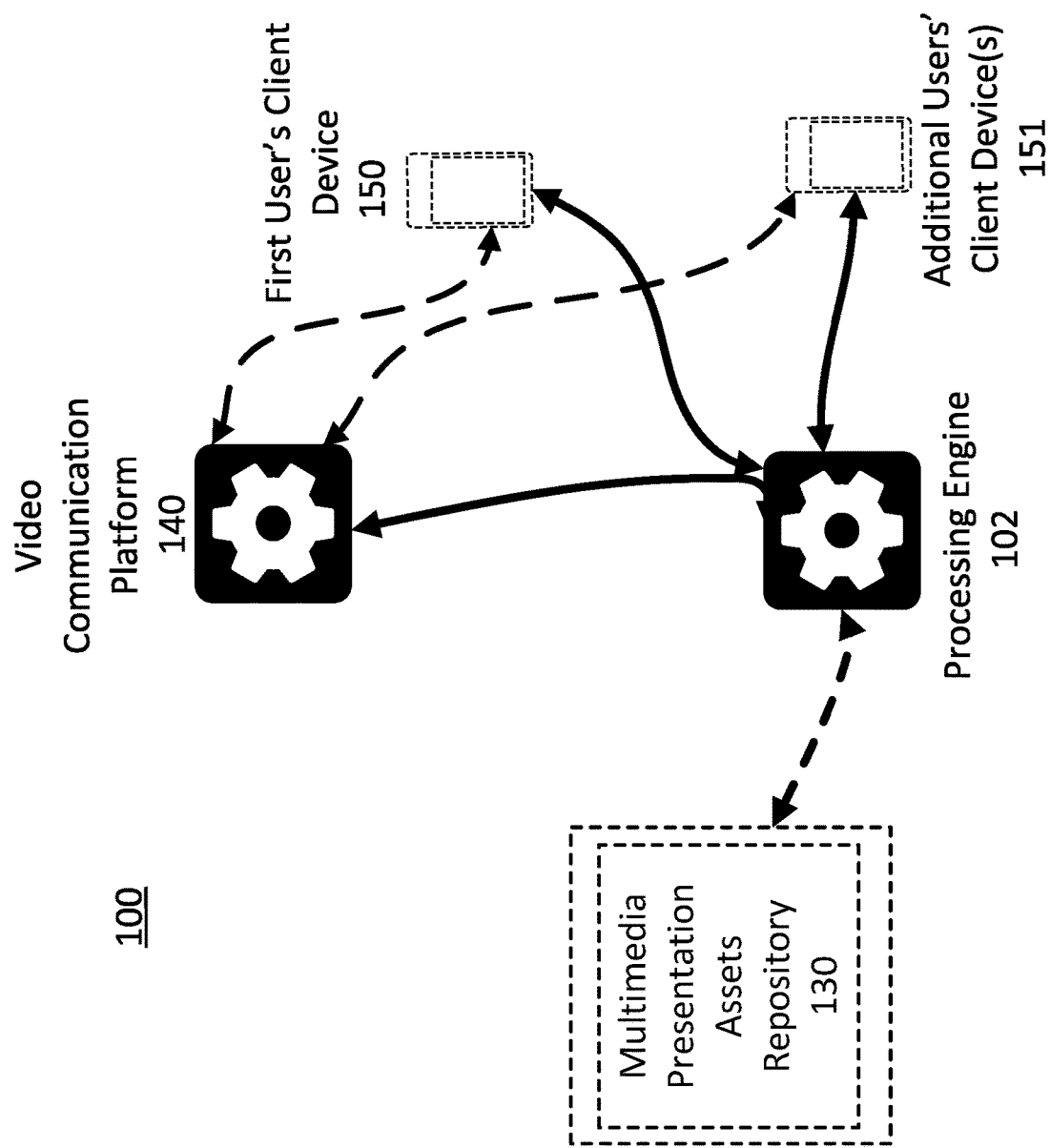
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a first user's client device 150 and one or more additional users' client device(s) 151 are connected to a processing engine 102 and, optionally, a video communication platform 140. The processing engine 102 is connected to the video communication platform 140, and optionally connected to one or more repositories (e.g., non-transitory data storage) and/or databases, including a Multimedia Presentation Assets Repository 130 for storing multi-media presentations. The first user's client device 150 and additional users' client device(s) 151 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 300, 400, 500, 600 or other methods herein and, as a result, provide for multi-stream video encoding for screen sharing a communications session. In some embodiments, this may be accomplished via communication with the first user's client device 150, additional users' client device(s) 151, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 151 may perform the methods 300, 400, 500, 600 or other methods herein and, as a result, provide for video stream downscaling and upscaling in a video communications platform. In some embodiments, this may be accomplished via communication with the first user's client device 150, additional users' client device(s) 151, processing engine 102, video communication platform 140, and/or other device(s) over a network between the device(s) and an application server or some other network server.

The first user's client device 150 and additional users' client device(s) 151 may be devices with a display configured to present information to a user of the device. In some embodiments, the first user's client device 150 and additional users' client device(s) 151 present information in the form of a user interface (UI) with UI elements or components. In some embodiments, the first user's client device 150 and additional users' client device(s) 151 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, video conference, webinar, or any other suitable video presentation) on a video communication platform. The additional users' client device(s) 151 may be configured to viewing the video presentation, and in some cases, presenting material and/or video as well. In some embodiments, first user's client device 150 and/or additional users' client device(s) 151 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 151 are computing devices capable of hosting and executing one or more applications or other programs capable of sending and/or receiving information. In some embodiments, the first user's client device 150 and/or additional users' client device(s) 151 may be a computer desktop or laptop, mobile phone, video phone, conferencing system, or any other suitable computing device capable of sending and receiving information. In some embodiments, the processing engine 102 and/or video communication platform 140 may be hosted in whole or in part as an application or web service executed on the first user's client device 150 and/or additional users' client device(s) 151. In some embodiments, one or more of the video communication platform 240, processing engine 102, and first user's client device 150 or additional users' client devices 151 may be the same device. In some embodiments, the first user's client device 150 is associated with a first user account on the video communication platform, and the additional users' client device(s) 151 are associated with additional user account(s) on the video communication platform.

Video communication platform 140 comprises a platform configured to facilitate video presentations and/or communication between two or more parties, such as within a video conference or virtual classroom. In some embodiments, video communication platform 140 enables video conference sessions between one or more users.

Figure 1B:
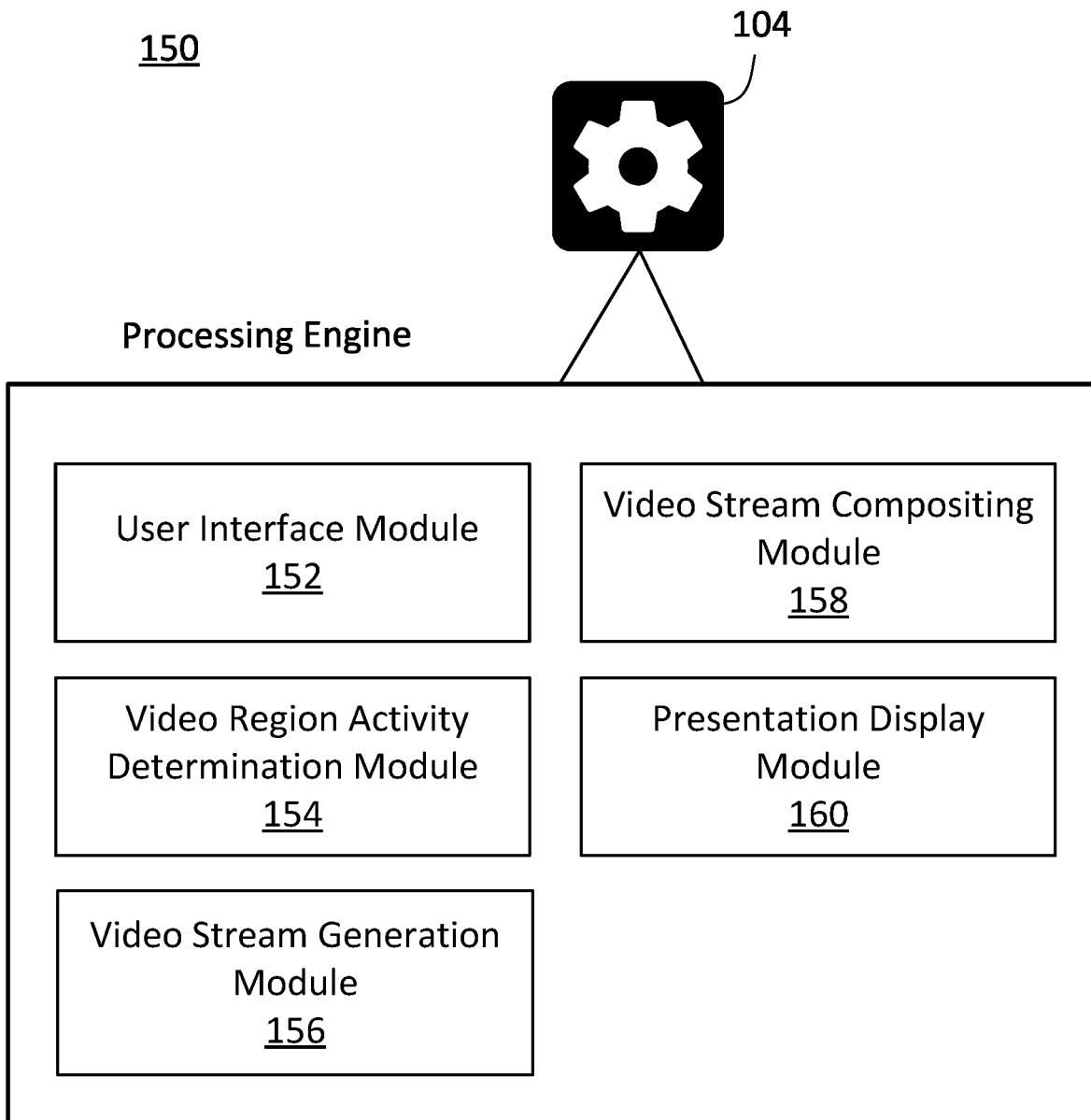
FIG. 1B is a diagram illustrating an exemplary computer system with software and/or hardware modules that may execute some of the functionality described herein.

FIG. 1B is a diagram illustrating an exemplary computer system 150 with software and/or hardware modules that may execute some of the functionality described herein. Computer system 150 may comprise, for example, a server or client device or a combination of server and client devices for multi-stream video encoding for screen sharing a communications session.

The User Interface Module 152 provides system functionality for presenting a user interface to one or more users of the video communication platform 140 and receiving and processing user input from the users. User inputs received by the user interface herein may include clicks, keyboard inputs, touch inputs, taps, swipes, gestures, voice commands, activation of interface controls, and other user inputs. In some embodiments, the User Interface Module 152 presents a visual user interface on a display screen. In some embodiments, the user interface may comprise audio user interfaces such as sound-based interfaces and voice commands.

The Display Region Activity Determination Module 154 provides system functionality for the detection and determination of one or more sub-areas of a display region. The Display region Activity Determination Module 154 also determines remaining areas of the display region that do not include sub-areas.

The Video Stream Generation Module 156 provides system functionality for the generation of video streams for the determined one or more active pixels areas of the display region and of the remaining area of the display region. The Video Stream Generation Module 156 provides for the transmission of separate video streams (e.g., separate streamed video channels). The Video Stream Generation Module may transmit the separate video streams at different bit rates. Also, the separate video streams may be video at different image frame rates, where one video stream has a video frame rate that is higher than another video stream.

The Video Stream Compositing Module 158 provides system functionality compositing separate video streams received from another client device. The receiving client device may combine two or more received video streams and display the compositive video stream via a user interface of the receiving client device.

The Presentation Display Module 160 provides system functionality for displaying or presenting multi-media presentation and/or screen sharing content that has video and/or animated graphics.

Figure 2:
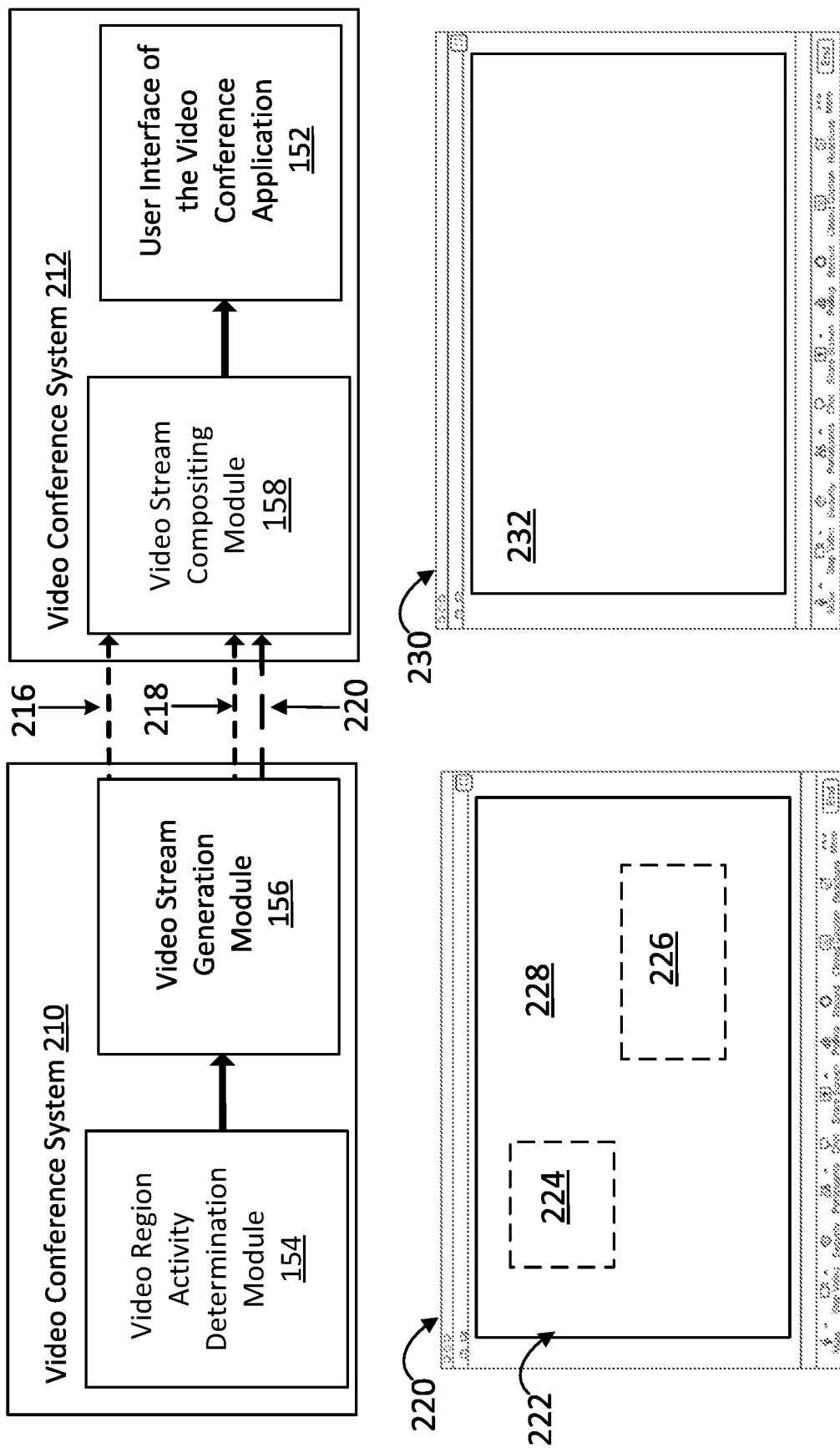
FIG. 2 is a diagram illustrating an exemplary environment in which some embodiments may operate.

FIG. 2 illustrates one or more client devices that may be used to participate in a video conference. In one embodiment, during a video conference, two video conference participants may communicate and transmit audio, video and other data to one another. A first video conference participant may use video conference system 210 and a second video conference participant may use video conference system 212. For example, the first video conference participant may present a multi-media presentation including embedded video in the presentation, or screen share some portion of a display output. The second video conference participant may receive one or more video streams depicting the display output for the first video conference participant.

In some embodiments, a first client device operating the video conference system 210 would evaluate a display region and determine one or more sub-areas of the display region 222. For example, the Display region Activity Determination Module 154 may evaluate areas of the display region 222 of the user interface 220, and determine one or more sub-areas 224, 226 of the display region. Additionally, the Display Region Activity Determination Module 154 may determine a remaining area 228 that does not include the one or more sub-areas 224, 226. The display region may be a region of a screen, user interface, and/or an area of visual information that may be presented by the first client device to other client devices. In other words, the display region may be a display of image frames of a screen or presentation shared with other the other client devices. Determination of the one or more sub-areas of a display region are discussed below.

In some embodiments, the first client device operating the video conference system 210, may generate multiple video steams (e.g., video channels) and transmit the multiple video streams to client devices of other video conference participants. For example, the video conference system 210 may transmit video streams 216, 218, 220 to the client device of the second video conference participant. While only three video streams 216, 218, 220 are depicted for illustration purposes, multiple video streams may be generated and transmitted by the video conference system 210. In this example, video stream 216 may include a video stream of the determined sub-area 224 of the display region 222. Video stream 218 may include a video stream of the determined sub-area 226 of the display region 222. Video stream 220 may include a video stream of the remaining area 228 of the display region 222.

In some embodiments, the video streams 216, 218, 220 include video at different image frame rates. In one example, the video stream 216 of the sub-area 224 may include video at a frame rate of 30 frames per second. The video stream 218 of the sub-area 226 may include video at a frame rate of 20 frames per second. In another example, both video streams 216, 218 of the sub-areas 224, 226 may include video at the same rate (such a 30 frames per second). The video stream 220 of the remaining area 228 of the display region 222 may be transmitted at a frame rate that is lower than the frame rate of the video of the video streams 216, 218 including the sub-areas 224, 226. For example, the frame rate of the video stream may be at a frame rate ranging from 3 to 20 frames per second.

In some embodiments, the second client device operating the video conference system 212 may receive multiple video streams. In some instances, the video conference system 212 may receive multiple video streams from multiple other video conference systems. For example, the video conference system 212 may receive multiple video streams 216, 218. A Video Stream Compositing Module 158 may combine the video streams to generate composited video stream to be displayed via a user interface 152, 230 of the second client device. The composited video stream may be presented via a display area 232 of the user interface 230.

In some embodiments, the Video Stream Compositing Module may evaluate the multiple video streams received from another client device and then generate video to be displayed on the client device receiving the video streams. The generated video may be displayed at frame rates corresponding to the video frame rates of the received video streams. For example, if the video stream 216 is at a frame rate of 60 frames per second, the video stream 218 is at a frame rate of 30 frames per second, and the video stream 220 is at a frame rate of 5 frames per second, then the Video Stream Compositing Module may generate for display a video an area of the video is at 60 frames per second, an area of the video is at 30 frames per second, and a portion of the video is at 5 frames per second. In other words, the receiving client device may display the multiple received video streams as a composite video with having frame rates corresponding to the frame rates of the video streams as received.

In some embodiments, the Video Stream Compositing Module 158 may evaluate the multiple video streams received from another client device and then generate a video at a frame rate of the highest frame rate received. For example, if the video stream 216 is at a frame rate of 60 frames per second, the video stream 218 is at a frame rate of 30 frames per second, and the video stream 220 is at a frame rate of 5 frames per second, then the Video Stream Compositing Module may generate for display a video combining frames of each of the video streams into frames of the video stream having the highest frame rate. In this example, the frames of the video stream 220 would be increase by 12 times and the frames of the video stream 218 would be increased two times.

Figure 3:
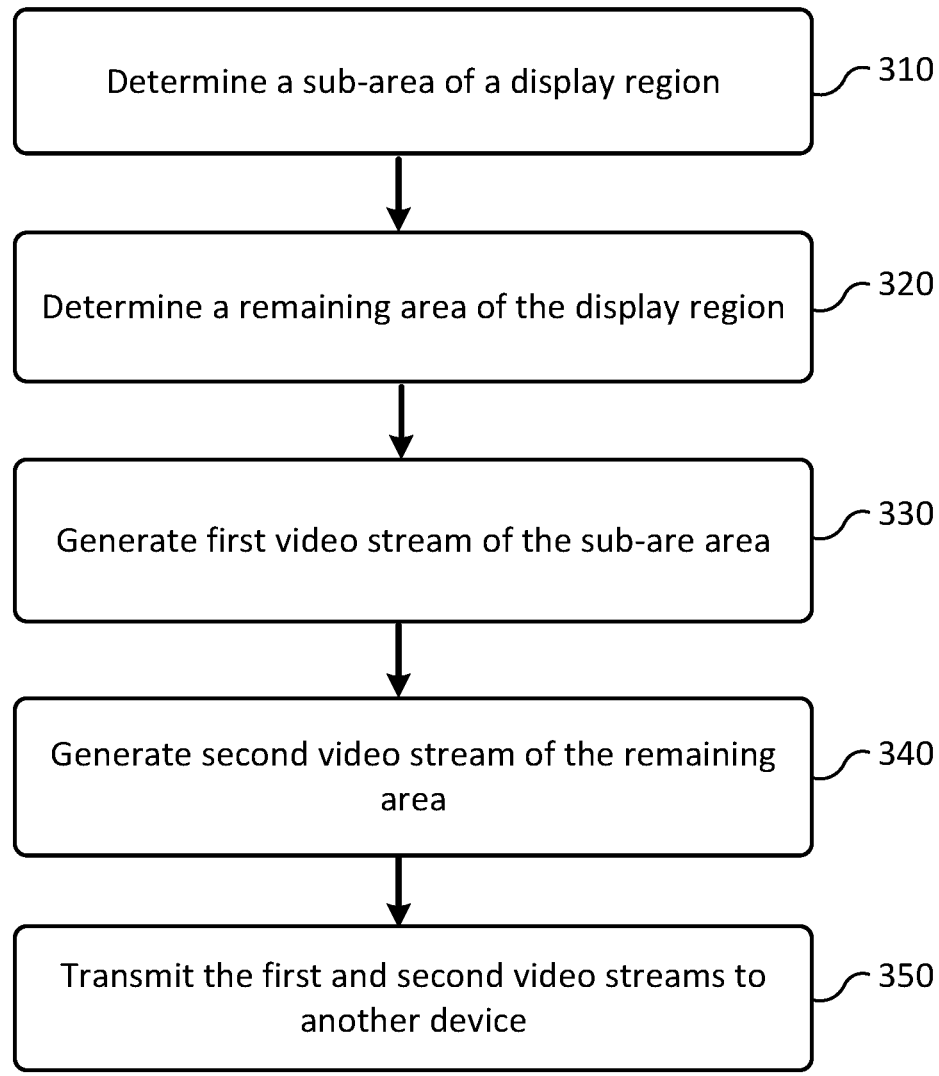
FIG. 3 is a flow chart illustrating an exemplary method that may be performed in some embodiments.

FIG. 3 is a flow chart illustrating an exemplary method 300 that may be performed in some embodiments. In step 310, the system 100 determines a sub-area of a display region. For example, a first client device may determine a sub-area that includes a sub-subset of pixels of a display region. A display region may include image frames of a screen, a portion of the screen, a shared presentation or other image, video content or multimedia content being shared by a client device during a communications session. For example, during the communication session, image frames of a screen, or other video output, may be generated and processed by a client device. In some embodiments, the sub-area of the display region includes an area of changing pixel values among consecutive frames depicting the display region. For example, changing values for a pixel may include, but is not limited to, pixel color values, pixel intensity values, pixel luminance values, etc. In some embodiments, a sub-area includes a video portion of the display region that is being shared by the client device.

In step 320, the system 100 determines a remaining area of the display region. For example, the first client device may determine a remaining area of the display region where the remaining area including a subset of pixels from the group of pixels that are outside (i.e., not part of or different than) of the sub-area. In some embodiments, the remaining area of the display region includes a portion of the display region that has a group of static pixel values among consecutive frames of the display region, or pixel values that do not change among consecutive frames (such as 3 or more consecutive frames).

In step 330, the system 100 generates a first video stream of the sub-area with the first video stream having a first frame rate. For example, the first client device may generate a first video stream of at least a portion of the sub-area of the display region. In some embodiments, the first video stream having a frame rate.

In step 340, the system 100 generates a second video stream of the remaining area with the second video stream having a second frame rate that is a frame rate lower than the first frame rate. For example, the first client device may generate a second video stream of at least a portion of the remaining area of the display region. In some embodiments, the second video stream has a second frame rate that is a frame rate lower than the first frame rate. In some embodiments, the first frame rate is a variable frame rate in a range of frame rates, and the second frame rate is a variable frame rate in a range of frame rates, where the range of the first frame rates is higher than the range of the second frame rates. For example, the first frame rate may be in a range of 15-30 frames per second, while the second frame rate may be in a range of 1-14 frames per second. In some embodiments, the second video stream (i.e., generally including the static pixel portion of the display region for non-video areas) is transmitted at a constant bit rate and the first video stream (i.e., including active or changing pixels within an area of the display region, such as a video being displayed) is transmitted at a variable bit rate.

At step 350, the system 100 transmits, by the first client device, the first video stream and the second video stream to a second client device. For example, the first client device may transmit a first video stream of a sub-area to the second client device at the first frame rate and may transmit a second video stream of the remaining area to the second client device at the second frame rate. In some embodiments, the first client device transmits the first video stream and the second-video stream to an intermediary server that transmits the first video stream and the second video stream to the second client device, and other client devices.

The system 100 may periodically monitor the display region and resize a sub-area. For example, the first client device may determine whether pixels about a boundary of the sub-area are changing among frames of the display region. Upon determining the pixels about the boundary of the sub-area is changing, the first client device may adjust a size of the sub-area to include those pixels that are determined to be changing. For example, initially a shared screen may display a video in a small area. The small area may increase to a larger size of the display region (such as a zooming operation being performed by a user). The first client device may periodically detect that a video area in a shared screen is increasing or decreasing, and the adjust the size of the sub-area. This adjustment in size then would cause the client device to increase or decrease the area of pixels being transmitted via a video stream of the sub-area.

Moreover, in some embodiments, the system 100 may determine multiple sub-areas of the display region. For example, the first client device may determine a second sub-area of the display region. The second sub-area may be another area of the display region that is distinct or different than the sub-area that was determined in step 310. The system 100 may generate a third video stream of the second sub-area. The third video stream may a third frame rate. This third frame rate may be a frame rate higher than the second frame rate of the second video stream. The client device may transmit the third video stream to a second client device concurrently with the first video stream and the second video stream. In some embodiments, the first video stream is transmitted at a variable bitrate, the second video stream is transmitted at a constant bitrate, and the third video stream is transmitted at a variable bitrate.

Figure 4:
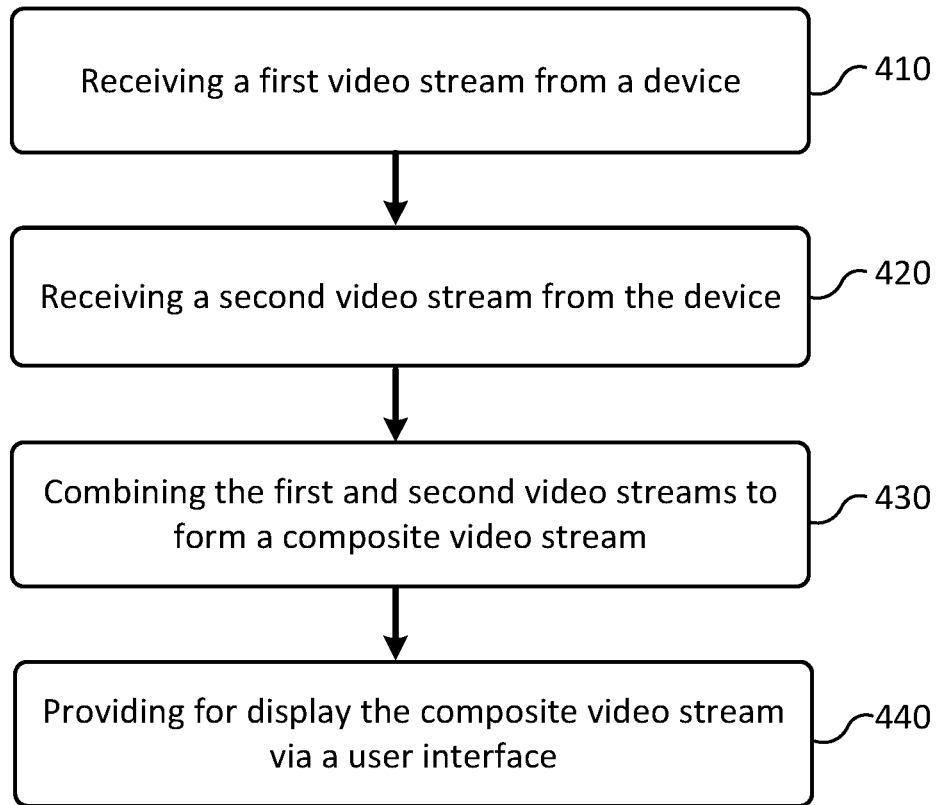
FIG. 4 is a flow chart illustrating an exemplary method that may be performed in some embodiments.

FIG. 4 is a flow chart illustrating an exemplary method 400 that may be performed in some embodiments. In some embodiments, multiple videos streams depicting a shared screen may be generated by a first client device and sent to other client devices. A receiving client device may synchronize and merge the received video stream to generate a full video depicting the shared screen of the first client device.

At step 410, a client device receives a first video stream having a frame rate. For example, the received video stream may be the first video stream generated and transmitted by the client device with respect to step 350 of FIG. 3.

At step 420, the client device receives a second video stream having a frame rate lower than the first frame rate. For example, the received video stream may be the second video stream generated and transmitted by the client device with respect to step 350 of FIG. 3.

At step 430, the client device combines the first video stream and the second video stream to form a composite video stream. The client device then provides for display the composite video stream to a user interface of the client device. In some embodiments, the composite video stream may be displayed at the frame rate of the first video stream.

Figure 5:
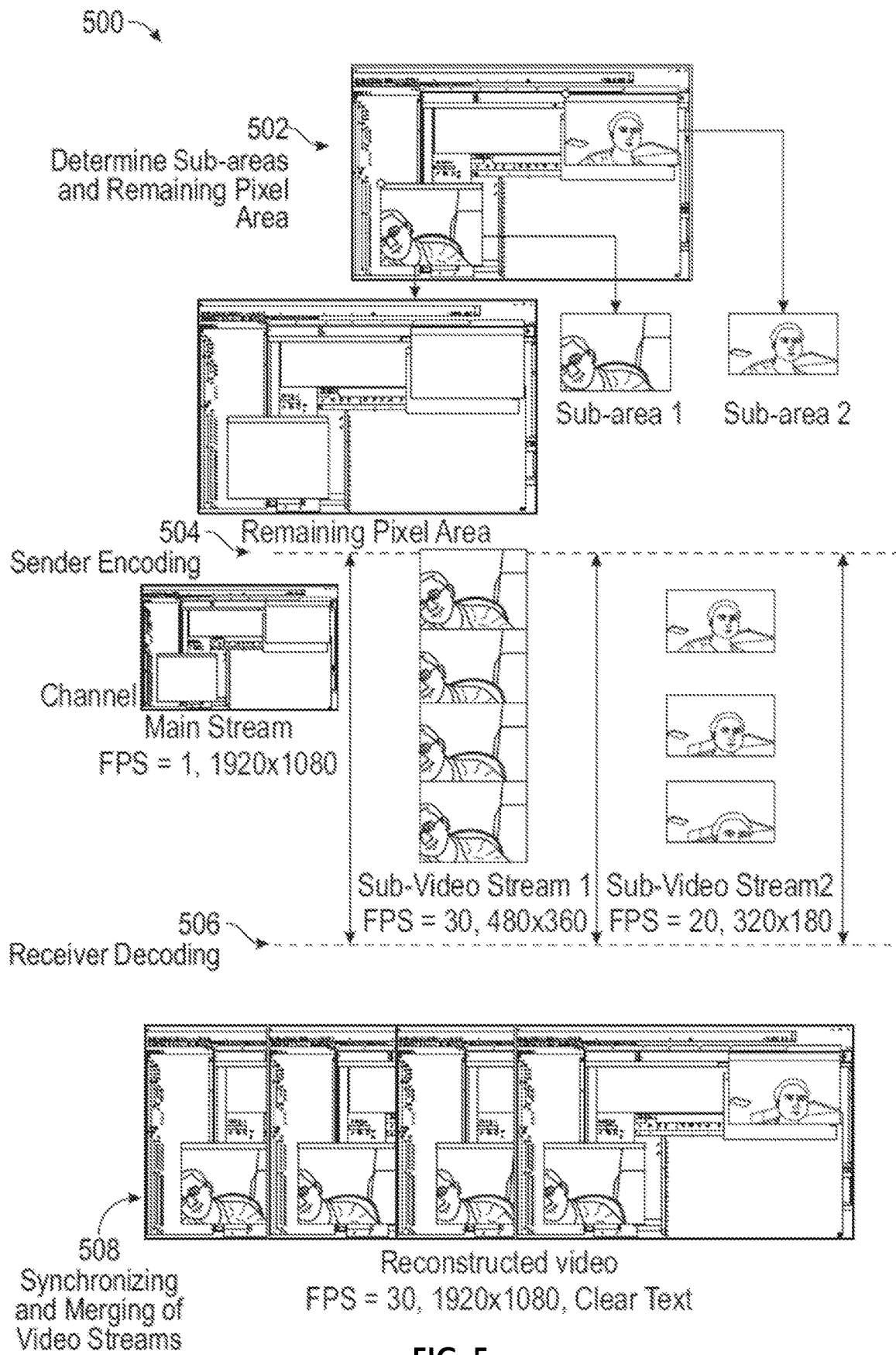
FIG. 5 is a flow chart illustrating an exemplary method that may be performed in some embodiments.

FIG. 5 is a flow chart illustrating an exemplary method 500 that may be performed in some embodiments. A multi-stream encoding method 500 is illustrated including the steps of determining sub-areas and a remaining area, sender encoding 504, receiver decoding 506 and synchronizing and merging of video streams 508. An example screen is being shared to other video conference participants. The shared screen includes two areas of video being displayed.

In step 502, a first client device determines one or more sub-areas and a remaining area. In some embodiments, sub-areas (e.g., sub-area 1 and sub-area 2) are separated from a remaining area of a display region (e.g., the full screen region with display region filling with black color noting that sub-areas 1 and 2 are not included. The regions of the video (i.e., the sub-area 1, sub-area 2, and the remaining area are encoded into bit-streams as sub-video streams. For example, the sub-area 1 and sub-area 2 may be encoded into video sub-streams using a fluency-first encoding method, and the remaining area may be encoded into a main video stream using a clarity-first encoding method. Multiple sub-video streams may be generated for each of the determined sub-areas. In other words, there may be more than one sub-video streams depending on how many sub-areas are determined in a screen being shared.

In step 504, the first client device generates multiple video streams based on the determined one or more sub-areas and the remaining area of a display region. In some embodiments, a main video stream including the remaining area, a sub-video stream of the sub-area 1, and a sub-video stream of sub-area 2 may be transmitted by a client device to a receiving device. For example, the first client device may transmit the main stream of the remaining area at 1 frame per second at a size of 1920×1080 pixels. The first client device may transmit the sub-video stream 1 of sub-area 1 at 30 frames per second at a size of 480×360 pixels. The first client device may transmit the sub-video stream 2 of sub-area 2 at 20 frames per second at a size of 320×180 pixels. In some embodiments, the frames of the video of the main stream and/or sub-streams may compressed via available compression processing prior to being transmitted to other devices.

In some embodiments, the frame rate of the sub-video streams may be determined by the client device based on bandwidth and/or processor constraints of the sending client device. For example, the first client device may set the frame rate of the sub-video stream 1 to a rate lower than 30 frames per second.

In step 506, the first client device transmits the generated multiple video streams (i.e., the main video stream of the remaining area and the sub-video streams 1 and 2 of the sub-area 1 and the sub-area 2) to one or more receiving client devices and/or to an intermediary server for transmission to client devices. In some embodiments, the first client device may transmit the multiple video streams to multiple receiving client devices. The receiving client devices perform an operation of video stream decoding (and optionally video decompression) on the received video streams.

In step 508, a receiving client device performs operations of synchronizing and merging of the multiple received video streams to generation a composite video to be displayed via a user interface of the receiving client device. As such, a full video is reconstructed depicting the screen being shared by the first client device. For example, a receiving client device may reconstruct frames of video based on frames from the main video stream and the sub-video streams 1 and 2. The receiving client device may display this composite video stream via a display device. The receiving client device may generate a composite video stream at the highest frame rate of one of the received sub-video streams. In this example, sub-video stream 1 has a frame rate of 30 and sub-video stream has a frame rate of 20. The receiving client device may generate a video for display at the highest frame rate, which in this example is 30 frames per second.

Figure 6:
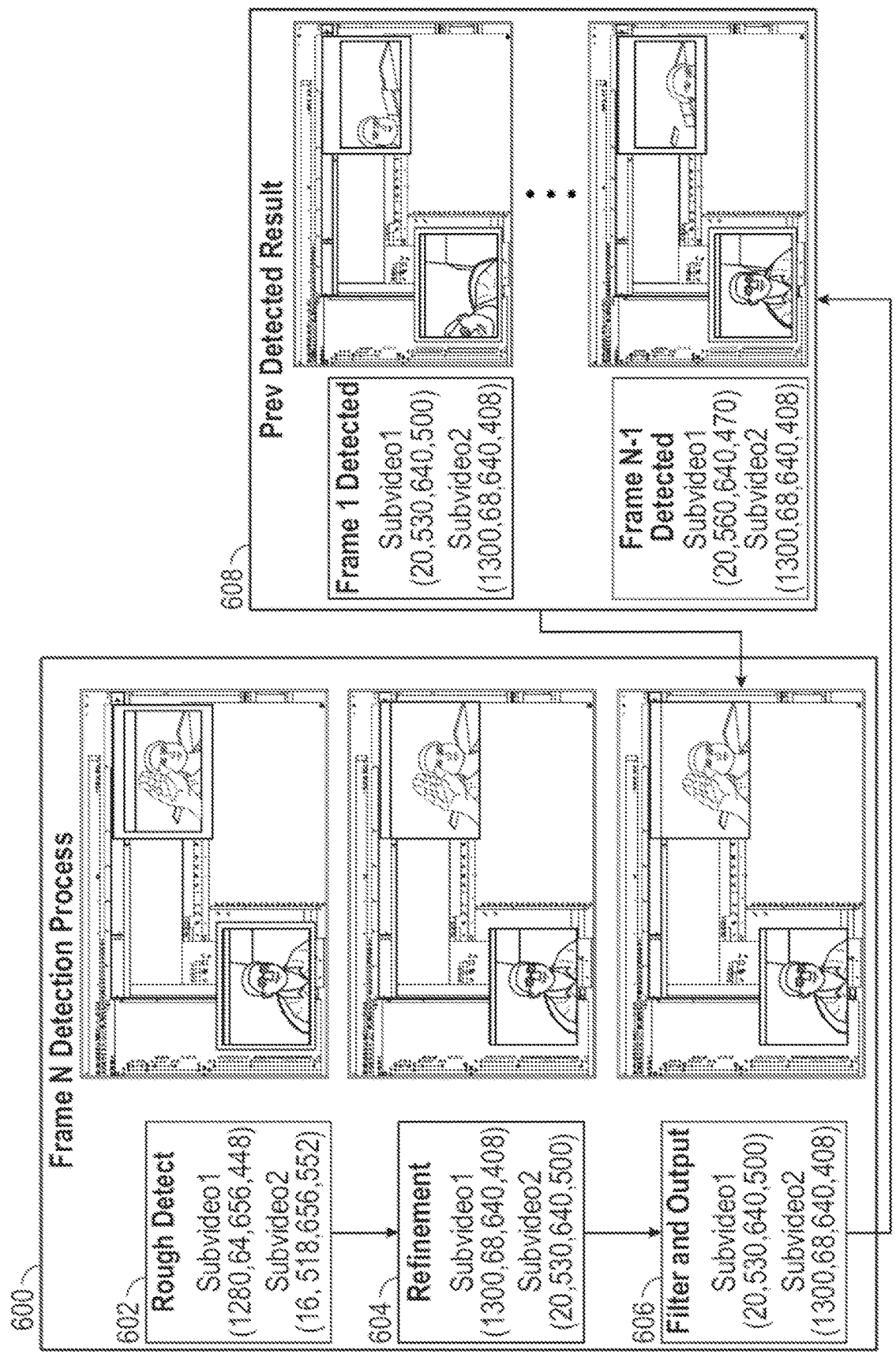
FIG. 6 is a flow chart illustrating an exemplary method that may be performed in some embodiments.

FIG. 6 is a flow chart illustrating an exemplary method 600 that may be performed in some embodiments. Determination of one or more sub-areas and a remaining area is illustrated by method 600. In some embodiments, the determination of sub-areas areas may include the steps of rough sub-video detection 602, refinement processing 604, filter and output processing 606, and detection of previous results 608.

In some embodiments, the method 600 detects temporally stable regions of each sub-video of a display region being displayed in the display region. This step determines a bounding box about a likely sub-area of pixels. The bounding box may be described by four parameters: X, Y, Width and Height, where (X, Y) is the coordinate of the top-left pixel of the display region. In some embodiments, there are two types of regions that may be determined: detected regions and output regions. A detected region/result is a detected display region using current frame information of the video and/or screen share. An output region/result is a final result used to separate sub-videos. The output region may be a sequentially stable result and does not change frequently.

In step 602, a detected region may be identified or determined, using a rough detection process, to be an area of likely changing pixels values (which indicates that video is likely present in the area). For example, the client device roughly identified a first sub-area 1 and a second sub-area 2. The first sub-area 1 includes pixels of coordinates 1280, 64, 656, 48. The second sub-area 2 include includes pixels of coordinates 16, 518, 656, 552. In this example, the client device has identified two rough sub-areas that include video being depicted in the display region.

In step 604, the detected region is further refined to reduce its original size to exclude the static pixels, or less frequently changing pixels, that are not part of the video. For example, the client device further refines the rough first sub-area 1 and rough second sub-area 2 to a more precise sub-area 1 (e.g., pixel coordinates 1300, 68, 640, 408) and sub-area 2 (e.g., pixel coordinates 20, 530, 640, 500). In some embodiments, step 604 may reduce the bounding box from the roughly determined size to the refined determined size.

In step 606, the detected results are refined to a pixel level. In step 608, after reordering and filtering using previous detected results, the final output result is achieved. For example, the refined sub-areas 1 and 2 may be further filtered and output a sub-area 1 (i.e., with coordinates of 20, 530, 640, 500) and sub-area 2 (i.e., with coordinates 1300, 68, 640, 408). These filtered sub-areas may form the areas that would be captured by the client device and encoded into a first video stream of the refined sub-area 1 and encoded into a second video stream of the refined sub-area 2.

In some embodiments, a client device may perform the rough video detection step 602 to identify an area of likely active pixels of video in a display region. In some embodiments, a client device may determine an area of likely active pixels of video in the display region includes comparing pixel values (such as a color and/or luminance value) to identify whether the pixel values of successive frames are changing. A bounding box may be place around a group of the determined actively changing pixels. This bounding box indicates a likely area of video being displayed in the display region.

In some embodiments, a client device may perform the refinement step 604 where a detected region is further refined to reduce its original size to exclude the static pixels that are not part of the video. After extension and separation, the detected results may be very close to the actual results.

In some embodiments, a client device may perform a reordering and filtering step 606 using previous detected results, the final output result is achieved. First, the client device performs the step of reordering detected results. The first searched display region might vary. Sometimes, sub-video 0 may be the first detected region. Sometimes sub-video 1 may be the first detected region. To increase the result stability, detected results may be reordered by comparing with previous output results.

Figure 7:
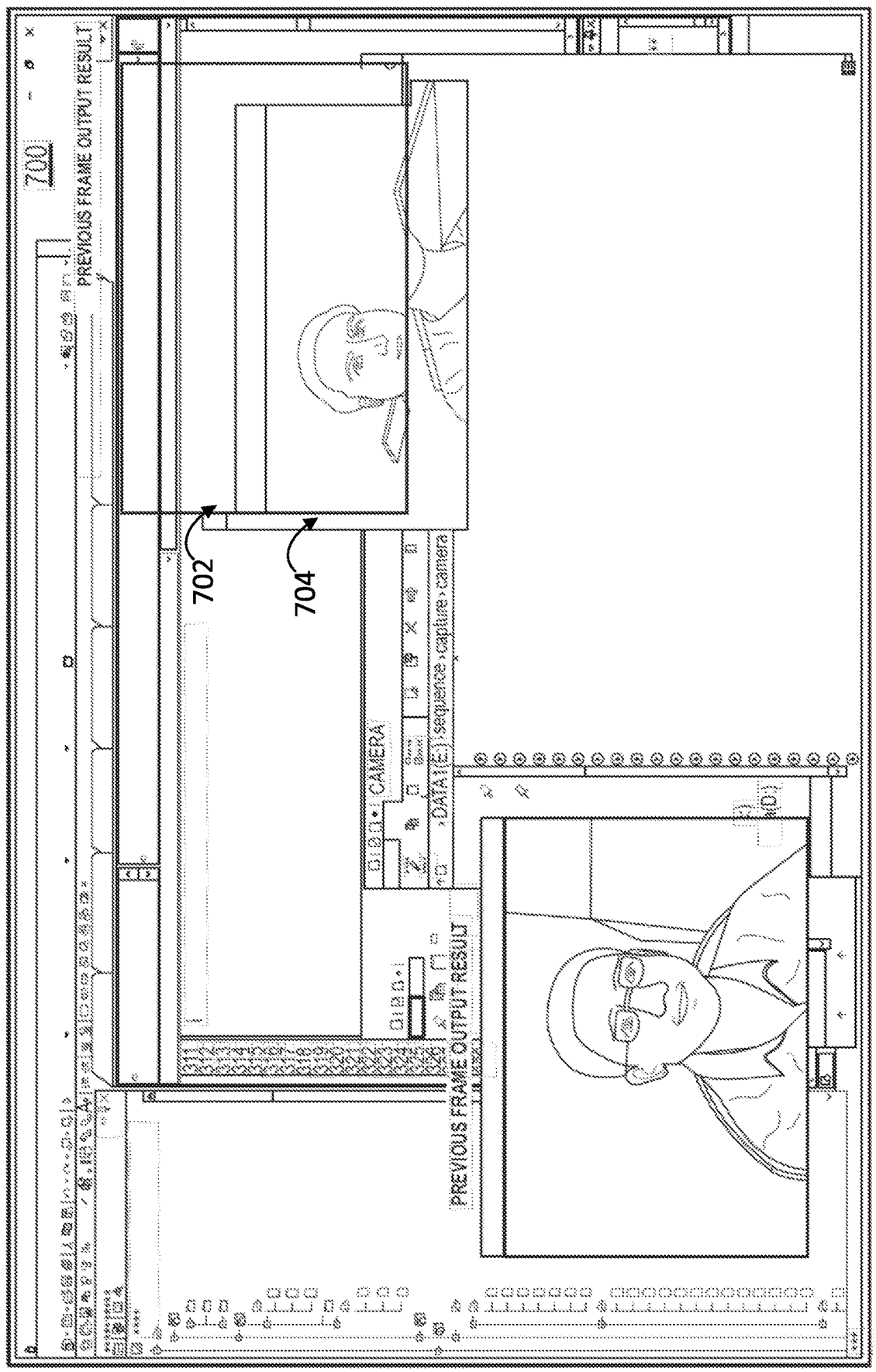
FIG. 7 is a diagram illustrating an exemplary user interface with a video dragging operation.

FIG. 7 is a diagram illustrating an exemplary user interface with 700 a video dragging operation causing image fragmentation. In some instances, while presenting a screen the user may drag a video from a first position 702 to a second position 704. In these situations, the client device may perform a process for detection of video dragging or movement of a video boundary from the first position to the second position. In this situation, the output as discussed previously may be changed quickly, otherwise image fragmentation might occur as depicted in FIG. 7. In some embodiments, if the client device detects a video dragging operation, the client device may perform the sub-area determination process as described with respect to FIG. 6.

Figure 8:
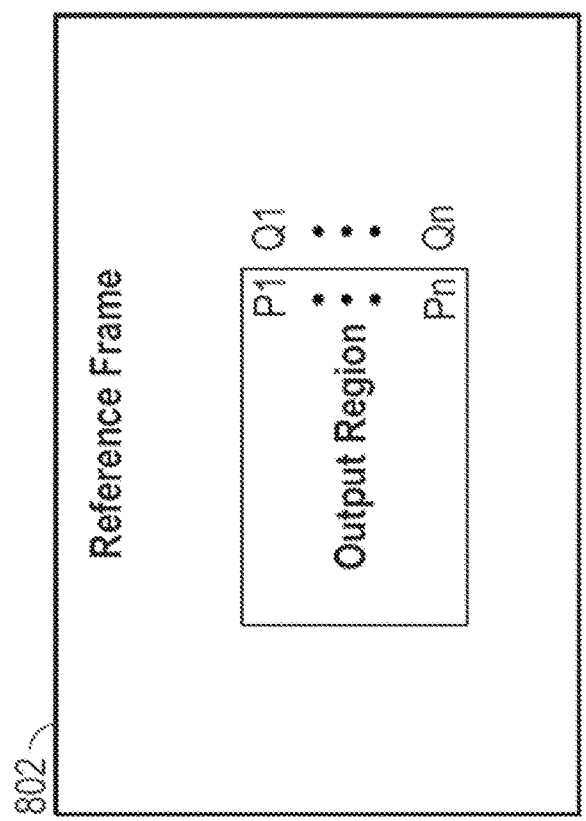
FIG. 8 is a diagram illustrating a current video frame and a reference for detecting display region movement.
Figure 8:
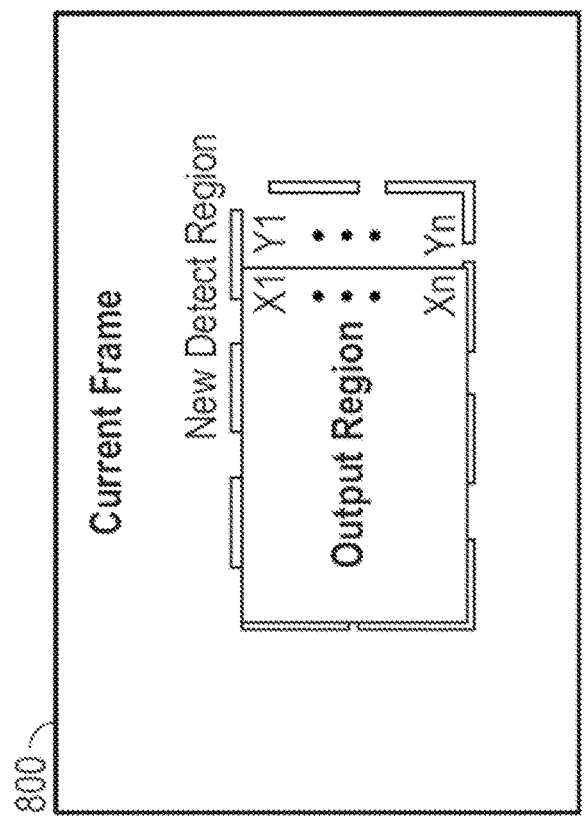

FIG. 8 is a diagram illustrating a current video frame and a reference for detecting display region movement. In some embodiments, to address possible image fragmentation due to video dragging, four cases may be detected using boundary pixels of a sub-display region. Boundary pixels in a sub-display region are described as to a current frame 800 as (X1-Xn, Y1-Yn) and as to a reference frame 802 AS (P1-Pn, Q1-Qn). X1-Xn and P1-Pn are pixels inside display region. Y1-Yn and Q1-Qn are pixels outside display region.

If the boundary pixels change frequently, the client device may determine that a sub-display region is being moved, such as such as a user dragging a video object or the video object automatically moving across the screens. In this instance, the previous output region would not be reliable and should be cleared. If boundary pixels change slightly or infrequently, the client device may determine the occurrence of sub-display region jitter. It this instance, the client device may extend the sub-display region and shrink the sub-display region back after the region is determined to be stable again (i.e., no further sub-display region jitter occurring).

The client device may determine that whether boundary pixels inside a sub-display region change slightly and outside pixels change a lot of a background area of the sub-video (such as by a user scrolling via an input device operation) and the sub-display region is remains the same in size. In this instance, the client device may determine that the previous sub-display region is reliable and should be kept.

Referring back to FIG. 5, in step 504, a first client device may generate multiple video streams based on the determined one or more sub-areas and the remaining area of a display region. In some embodiments, the video context and text of the multiple video streams may be encoded adaptively. For example, a sub-video stream 216, 218 may be encoded with the same parameter of a video sharing mode, low resolution and high frame rate. In another example, the main video stream 220 may be encoded with the same parameter as normal sharing mode, a high resolution and a frame rate less than the frame rate of the sub-videos stream(s) 216, 218. In another example, the main video stream 220 may be encoded with a main encoder, sub-video stream 216, 218 is encoded with a sub-video encoder. In another example, the first client device may use a sub-video encoder comprising a hardware encoder and/or a software encoder. In another example, a main encoder and sub-video encoder utilized in parallel to accelerate encoding speed of the multiple video streams 216, 218, 220. In yet another example, the main video stream 220 and sub-video stream(s) 216, 218 are simultaneously sent to a receiving client device, and the receiving client device will separately decode the main video stream 220 and the sub-video streams(s) 216, 218.

In some embodiments, the first client device may perform bit allocation between the main video stream 220 and sub-video stream(s) 216, 218. For a limited network bandwidth, the first client device may transmit the encoding bit-stream to the receiving client device. In this instance, a target encoding bitrate may be used for respective encoding parameters for the main video stream 220 and for the sub-video stream(s) 216, 218. For sub-video steams(s) 216, 218, the encoded bitrate would be relatively constant. But for the main video stream 220, because there may be violent or intense bitrate changes for static and fast motion contents (such as sudden emerging web page, fast scrolling bar, etc.), the main video stream 220 may have a large bitrate gap between encoded bitrate and target bitrate. In this instance, the following adaptive bit allocation be used. If bandwidth is larger than the total target bitrate, allocate the bandwidth with a linear model; and if bandwidth is smaller than the total target bitrate, the bandwidth of sub-video stream may be tuned according to gap between the bandwidth and the encoded bitrate for main video stream 220 and sub-video stream(s) 216, 218.

As noted previously, the main video stream 220 and sub-video stream(s) 216, 218 may be transmitted by the first client device separately to one or more other client devices. However, sometimes the main video stream 220 and the sub-video stream(s) 216, 218 may not be received and decoded simultaneously by the receiving client device. In such an instance, the video streams received by a client device may need to be synchronizes so as to avoid being combined or composited incorrectly. A stream_seq_index syntax may be used to sync the main video stream 220 and the sub-video stream(s) 216, 218, where the main video stream and the sub-video streams have the same identifier (ID) that can be mixed and displayed. For example, a stream_seq_index value may start at 0 and may be transmitted in an Real-time Transport Protocol (RTP) extension for an RTP package. If total number of main video stream and sub-video stream changes, the stream_seq_index value will increase. This process may optionally include a decoder check where the client device may perform a decoder check the integrity of the received main stream 220 and sub-video stream(s) 216, 218. The integrity means that the main video stream 220 and the sub-video streams(s) 216, 218 have the same stream_seq_index and the decoded stream number is equal to streamnum (i.e., the total number of the stream). If the integrity is true, the receiving device may mix the video streams 220, 216, 218 into one composite video for displaying via a user interface of the receiving client device. Since the main decoder and sub-video decoder decode and mix the bitstream sequentially, and sub-video stream has higher frame rate, the receiving client device may mix an output video for display depending on sub-video stream 216, 218. If one picture of sub-video stream 216, 218 refreshes or the refresh time interval is larger than a fixed interval (such as 50 ms), the receiving device may display the mixed picture of the main video stream 220 and the sub-video stream(s) 216, 218.

Figure 9:
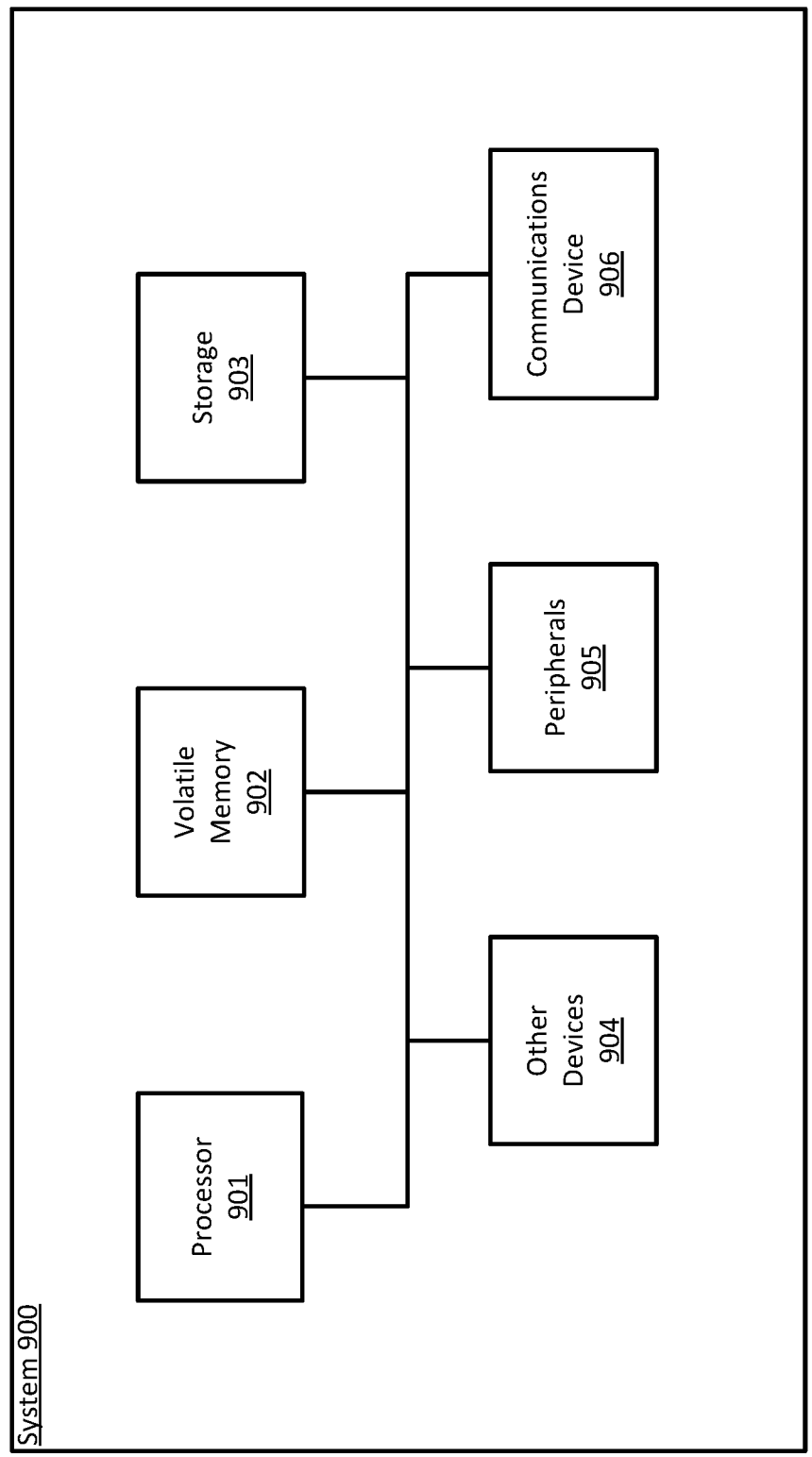
FIG. 9 is a diagram illustrating an exemplary computer that may perform processing in some embodiments.

FIG. 9 is a diagram illustrating an exemplary computer that may perform processing in some embodiments. Exemplary computer 900 may perform operations consistent with some embodiments. The architecture of computer 900 is exemplary. Computers can be implemented in a variety of other ways. A wide variety of computers can be used in accordance with the embodiments herein.

Processor 901 may perform computing functions such as running computer programs. The volatile memory 902 may provide temporary storage of data for the processor 901. RAM is one kind of volatile memory. Volatile memory typically requires power to maintain its stored information. Storage 903 provides computer storage for data, instructions, and/or arbitrary information. Non-volatile memory, which can preserve data even when not powered and including disks and flash memory, is an example of storage. Storage 903 may be organized as a file system, database, or in other ways. Data, instructions, and information may be loaded from storage 903 into volatile memory 902 for processing by the processor 901.

The computer 900 may include peripherals 905. Peripherals 905 may include input peripherals such as a keyboard, mouse, trackball, video camera, microphone, and other input devices. Peripherals 905 may also include output devices such as a display. Peripherals 905 may include removable media devices such as CD-R and DVD-R recorders/players. Communications device 906 may connect the computer 900 to an external medium. For example, communications device 906 may take the form of a network adapter that provides communications to a network. A computer 900 may also include a variety of other devices 904. The various components of the computer 900 may be connected by a connection medium such as a bus, crossbar, or network.

It will be appreciated that the present disclosure may include any one and up to all of the following examples.

Example 1: A computer-implemented method comprising: determining a sub-area of a display region, the display region including a group of pixels and the sub-area including a subset of the group of pixels; determining a remaining area of the display region, the remaining area including a subset of pixels from the group of pixels that are outside of the sub-area; generating a first video stream of at least a portion of the sub-area of the display region, the first video stream having a first frame rate; generating a second video stream of at least a portion of the remaining area of the display region, the second video stream having a second frame rate that is a frame rate lower than the first frame rate; and transmitting, by a first client device, the first video stream and the second video stream to a second client device.

determining a sub-area of a display region; determining a remaining area of the display region; generating a first video stream of the sub-area, the first video stream having a first frame rate; generating a second video stream of the remaining area, the second video stream having a second frame rate that is a frame rate lower than the first frame rate; and transmitting, by a first client device, the first video stream and the second video stream to a second client device.

Example 2: The computer-implemented method of Example 1, wherein the sub-area of the display region includes an area of changing pixel values among consecutive frames of the display region.

Example 3: The computer-implemented method of any one of Examples 1-2, wherein the remaining area of the display region includes a portion of the display region that has a group of static pixel values among consecutive frames of the display region.

Example 4: The computer-implemented method of any one of Examples 1-3, further comprising: determining whether pixels about a boundary of the sub-area are changing among frames of the display region; increasing a size of the sub-area to include those pixels that are determined to be changing in values, or decreasing a size of the sub-area to exclude those pixels that are determined to be not-change in values.

Example 5: The computer-implemented method of any one of Examples 1-4, wherein the first video stream is transmitted at a variable bitrate, and the second video stream is transmitted at a constant bitrate.

Example 6: The computer-implemented method of any one of Examples 1-5, further comprising: determining a second sub-area of the display region; generating a third video stream of the second sub-area, the third video stream having a third frame rate; and transmitting, by the first client device, the third video stream to a second client device concurrently with the first video stream and the second video stream.

Example 7: The computer-implemented method of any one of Examples 1-6, comprising: receiving, by the first client device, a third video stream having a third frame rate, the third video stream generated by the second client device; receiving, by the first client device, a fourth video stream having a fourth frame rate, the fourth frame rate being a frame rate greater than the third frame rate; combining, by the first client device, the third video stream and the fourth video stream to form a composite video stream; and providing for display the composite video stream to a user interface of the first client device, wherein the composite video stream displays at the frame rate of the third video stream.

Example 8: A non-transitory computer readable medium that stores executable program instructions that when executed by one or more computing devices configure the one or more computing devices to perform operations comprising: determining a sub-area of a display region, the display region including a group of pixels and the sub-area including a subset of the group of pixels; determining a remaining area of the display region, the remaining area including a subset of pixels from the group of pixels that are outside of the sub-area; generating a first video stream of at least a portion of the sub-area of the display region, the first video stream having a first frame rate; generating a second video stream of at least a portion of the remaining area of the display region, the second video stream having a second frame rate that is a frame rate lower than the first frame rate; and transmitting, by a first client device, the first video stream and the second video stream to a second client device.

Example 9: The non-transitory computer readable medium of Example 8, wherein the sub-area of the display region includes an area of changing pixel values among consecutive frames of the display region.

Example 10: The non-transitory computer readable medium of any one of Examples 8-9 The non-transitory computer readable medium of claim 8, wherein the remaining area of the display region includes a portion of the display region that has a group of static pixel values among consecutive frames of the display region.

Example 11: The non-transitory computer readable medium of any one of Examples 8-10, the operations further comprising: determining whether pixels about a boundary of the sub-area are changing among frames of the display region; and increasing a size of the sub-area to include those pixels that are determined to be changing in values, or decreasing a size of the sub-area to exclude those pixels that are determined to be not-change in values.

Example 12: The non-transitory computer readable medium of any one of Examples 8-11, wherein the first video stream is transmitted at a variable bitrate, and the second video stream is transmitted at a constant bitrate.

Example 13: The non-transitory computer readable medium of any one of Examples 8-12, the operations further comprising: determining a second sub-area of the display region; generating a third video stream of the second sub-area, the third video stream having a third frame rate; and transmitting, by the first client device, the third video stream to a second client device concurrently with the first video stream and the second video stream.

Example 14: The non-transitory computer readable medium of any one of Examples 8-13, the operations further comprising: receiving, by the first client device, a third video stream having a third frame rate, the third video stream generated by the second client device; receiving, by the first client device, a fourth video stream having a fourth frame rate, the fourth frame rate being a frame rate greater than the third frame rate; combining, by the first client device, the third video stream and the fourth video stream to form a composite video stream; and providing for display the composite video stream to a user interface of the first client device, wherein the composite video stream displays at the frame rate of the third video stream.

Example 15: A system comprising one or more processors configured to perform the operations of: determining a sub-area of a display region, the display region including a group of pixels and the sub-area including a subset of the group of pixels; determining a remaining area of the display region, the remaining area including a subset of pixels from the group of pixels that are outside of the sub-area; generating a first video stream of at least a portion of the sub-area of the display region, the first video stream having a first frame rate; generating a second video stream of at least a portion of the remaining area of the display region, the second video stream having a second frame rate that is a frame rate lower than the first frame rate; and transmitting, by a first client device, the first video stream and the second video stream to a second client device.

Example 16: The system of Example 15, wherein the sub-area of the display region includes an area of changing pixel values among consecutive frames of the display region.

Example 17: The system of any one of Examples 15-16, wherein the remaining area of the display region includes a portion of the display region that has a group of static pixel values among consecutive frames of the display region.

Example 18: The system of any one of Examples 15-17, the operations further comprising: determining whether pixels about a boundary of the sub-area are changing among frames of the display region; and increasing a size of the sub-area to include those pixels that are determined to be changing in values, or decreasing a size of the sub-area to exclude those pixels that are determined to be not-change in values.

Example 19: The system of any one of Examples 15-18, wherein the first video stream is transmitted at a variable bitrate, and the second video stream is transmitted at a constant bitrate.

Example 20: The system of any one of Examples 15-19, the operations further comprising: determining a second sub-area of the display region; generating a third video stream of the second sub-area, the third video stream having a third frame rate; and transmitting, by the first client device, the third video stream to a second client device concurrently with the first video stream and the second video stream.

Example 21: The system of any one of Examples 15-20, the operations further comprising: receiving, by the first client device, a third video stream having a third frame rate, the third video stream generated by the second client device; receiving, by the first client device, a fourth video stream having a fourth frame rate, the fourth frame rate being a frame rate greater than the third frame rate; combining, by the first client device, the third video stream and the fourth video stream to form a composite video stream; and providing for display the composite video stream to a user interface of the first client device, wherein the composite video stream displays at the frame rate of the third video stream.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:
    determining a sub-area of a display region, the display region including a group of pixels and the sub-area including a subset of the group of pixels;
    determining a remaining area of the display region, the remaining area including a subset of pixels from the group of pixels that are outside of the sub-area;
    generating a first video stream of at least a portion of the sub-area of the display region, the first video stream having a first frame rate;
    generating a second video stream of at least a portion of the remaining area of the display region, the second video stream having a second frame rate that is a frame rate lower than the first frame rate;
    transmitting, by a first client device, the first video stream and the second video stream to a second client device;
    determining a second sub-area of the display region;
    generating a third video stream of the second sub-area, the third video stream having a third frame rate; and
    transmitting, by the first client device, the third video stream to a second client device concurrently with the first video stream and the second video stream.

2. The computer-implemented method of claim 1, wherein the sub-area of the display region includes an area of changing pixel values among consecutive frames of the display region.

3. The computer-implemented method of claim 1, wherein the remaining area of the display region includes a portion of the display region that has a group of static pixel values among consecutive frames of the display region.

4. The computer-implemented method of claim 1, further comprising:
    determining whether pixels about a boundary of the sub-area are changing among frames of the display region; and
    increasing a size of the sub-area to include those pixels that are determined to be changing in values, or decreasing a size of the sub-area to exclude those pixels that are determined to be not-change in values.

5. The computer-implemented method of claim 1, wherein the first video stream is transmitted at a variable bitrate, and the second video stream is transmitted at a constant bitrate.

6. A non-transitory computer readable medium that stores executable program instructions that when executed by one or more computing devices configure the one or more computing devices to perform operations comprising:
    determining a sub-area of a display region, the display region including a group of pixels and the sub-area including a subset of the group of pixels;

determining a remaining area of the display region, the remaining area including a subset of pixels from the group of pixels that are outside of the sub-area;

generating a first video stream of at least a portion of the sub-area of the display region, the first video stream having a first frame rate;

generating a second video stream of at least a portion of the remaining area of the display region, the second video stream having a second frame rate that is a frame rate lower than the first frame rate;

transmitting, by a first client device, the first video stream and the second video stream to a second client device;

determining a second sub-area of the display region;

generating a third video stream of the second sub-area, the third video stream having a third frame rate; and transmitting, by the first client device, the third video stream to a second client device concurrently with the first video stream and the second video stream.

7. The non-transitory computer readable medium of claim 6, wherein the sub-area of the display region includes an area of changing pixel values among consecutive frames of the display region.

8. The non-transitory computer readable medium of claim 6, wherein the remaining area of the display region includes a portion of the display region that has a group of static pixel values among consecutive frames of the display region.

9. The non-transitory computer readable medium of claim 6, the operations further comprising:
determining whether pixels about a boundary of the sub-area are changing among frames of the display region; and
increasing a size of the sub-area to include those pixels that are determined to be changing in values, or decreasing a size of the sub-area to exclude those pixels that are determined to be not-change in values.

10. The non-transitory computer readable medium of claim 6, wherein the first video stream is transmitted at a variable bitrate, and the second video stream is transmitted at a constant bitrate.

11. A system comprising one or more processors configured to perform the operations of:
determining a sub-area of a display region, the display region including a group of pixels and the sub-area including a subset of the group of pixels;
determining a remaining area of the display region, the remaining area including a subset of pixels from the group of pixels that are outside of the sub-area;
generating a first video stream of at least a portion of the sub-area of the display region, the first video stream having a first frame rate;
generating a second video stream of at least a portion of the remaining area of the display region, the second video stream having a second frame rate that is a frame rate lower than the first frame rate;
transmitting, by a first client device, the first video stream and the second video stream to a second client device;
determining a second sub-area of the display region;
generating a third video stream of the second sub-area, the third video stream having a third frame rate; and
transmitting, by the first client device, the third video stream to a second client device concurrently with the first video stream and the second video stream.

12. The system of claim 11, wherein the sub-area of the display region includes an area of changing pixel values among consecutive frames of the display region.

13. The system of claim 11, wherein the remaining area of the display region includes a portion of the display region that has a group of static pixel values among consecutive frames of the display region.

14. The system of claim 11, the operations further comprising:
determining whether pixels about a boundary of the sub-area are changing among frames of the display region; and
increasing a size of the sub-area to include those pixels that are determined to be changing in values, or decreasing a size of the sub-area to exclude those pixels that are determined to be not-change in values.

15. The system of claim 11, wherein the first video stream is transmitted at a variable bitrate, and the second video stream is transmitted at a constant bitrate.

16. A computer-implemented method comprising:
determining a sub-area of a display region, the display region including a group of pixels and the sub-area including a subset of the group of pixels;
determining a remaining area of the display region, the remaining area including a subset of pixels from the group of pixels that are outside of the sub-area;
generating a first video stream of at least a portion of the sub-area of the display region, the first video stream having a first frame rate;
generating a second video stream of at least a portion of the remaining area of the display region, the second video stream having a second frame rate that is a frame rate lower than the first frame rate;
transmitting, by a first client device, the first video stream and the second video stream to a second client device;
receiving, by the first client device, a third video stream having a third frame rate, the third video stream generated by the second client device;
receiving, by the first client device, a fourth video stream having a fourth frame rate, the fourth frame rate being a frame rate greater than the third frame rate;
combining, by the first client device, the third video stream and the fourth video stream to form a composite video stream; and
providing for display the composite video stream to a user interface of the first client device, wherein the composite video stream displays at the frame rate of the third video stream.

17. A non-transitory computer readable medium that stores executable program instructions that when executed by one or more computing devices configure the one or more computing devices to perform operations comprising:
determining a sub-area of a display region, the display region including a group of pixels and the sub-area including a subset of the group of pixels;
determining a remaining area of the display region, the remaining area including a subset of pixels from the group of pixels that are outside of the sub-area;
generating a first video stream of at least a portion of the sub-area of the display region, the first video stream having a first frame rate;
generating a second video stream of at least a portion of the remaining area of the display region, the second video stream having a second frame rate that is a frame rate lower than the first frame rate;
transmitting, by a first client device, the first video stream and the second video stream to a second client device;
receiving, by the first client device, a third video stream having a third frame rate, the third video stream generated by the second client device;

receiving, by the first client device, a fourth video stream having a fourth frame rate, the fourth frame rate being a frame rate greater than the third frame rate;

combining, by the first client device, the third video stream and the fourth video stream to form a composite video stream; and providing for display the composite video stream to a user interface of the first client device, wherein the composite video stream displays at the frame rate of the third video stream.

\* \* \* \* \*